Figure 2:
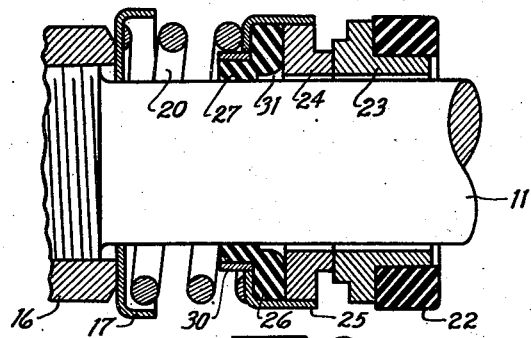

May 14, 1940.　　R. W. CHRISTMAN ET AL　　2,200,413

ROTARY SHAFT SEAL

Filed Dec. 8, 1938

INVENTOR
ROBERT W. CHRISTMAN.
WILLETT J. McCORTNEY
BY
ATTORNEY

Patented May 14, 1940

2,200,413

UNITED STATES PATENT OFFICE 2,200,413

ROTARY SHAFT SEAL

Robert W. Christman, Pontiac, and Willett J. McCortney, Royal Oak, Mich., assignor to Chrysler Corporation, Detroit, Mich., a corporation of Delaware Application December 8, 1938, Serial No. 244,626

1 Claim. (Cl. 286—11)

Our invention relates to an improvement in shaft seals, particularly seals for rotary shafts extending into a casing within which one pressure exists from a space in which another pressure exists. In particular, the invention has great utility in sealing the shaft opening of a refrigerant compressor comprising a casing within which a low pressure, corresponding to the suction pressure of a refrigerating system, exists during operation of the compressor and a high pressure, corresponding to the balanced pressure of a refrigerating system, exists when the compressor is not in operation. In such a system the suction pressure may be as low as five or ten pounds per square inch during operation of the compressor and the interior of the crankcase may be subjected to a pressure as high as eighty pounds per square inch when the compressor is not in operation. Accordingly, the seal must be capable of excluding the atmosphere at certain times when a partial vacuum exists in the casing, and must be capable of resisting an out-rush of valuable refrigerant at other times when the compressor is not in operation and a higher-than-atmospheric pressure exists in the interior of the crankcase.

Our invention is an improvement in a known type of seal exemplified by the patents to Cooke, No. 1,545,080, dated July 7, 1925, and No. 1,869,933, dated August 2, 1932. In this type of seal a rotary sealing ring of some hard composition is forced against a stationary sealing ring of a different hard composition, the stationary sealing ring being seated upon a resilient gasket whereby to prevent the escape of gas or the admission of air between the adjacent surfaces of the stationary sealing ring and the casing, and the rotary sealing ring being engaged by a resilient sealing member which prevents the escape of gas or the admission of air between the adjacent surfaces of the shaft and the rotary sealing ring. In order to be certain that such a pressure is exerted against the rotary sealing member as to cause its wearing surface to engage the adjacent wearing surface of the stationary sealing member at all times, there is usually provided a compression spring bearing against a shoulder on the shaft, which spring also forces the resilient ring into sealing engagement with the rotary sealing member. Our invention has to do in particular with an improvement in the contour and shape of the resilient sealing ring engaging the shaft and the rotary sealing member, whereby the life of this type of seal is considerably lengthened.

In this type of seal it is the usual practice to form the resilient sealing ring of an artificial rubber composition such as "Neoprene," which is a composition of well known formula and characteristics. This sealing member was usually formed so as to be as unyielding to deformation as possible while yielding sufficiently to permit the rotary sealing member to remain seated regardless of any variations in contour of the sealing members. After considerable use the resilient sealing ring appears to become permanently attached to the surface of the shaft which it engages, the attachment becoming firmer the longer the seal remains in use so that in some cases the resilient member becomes as firmly bonded to the surface of the shaft as if it had been vulcanized thereon. Due to this attachment of the resilient member to the shaft the compression spring, which tends to force the rotary sealing member against the fixed sealing member, can no longer exert sufficient force to overcome the resistance to movement of the resilient member, particularly after the engaging surfaces of the sealing members have worn to considerable extent; or if the spring is strong enough the material of the resilient ring cracks or tears, and no matter how minute such cracks may be the seal soon fails to operate satisfactorily. It is the object of our invention to so form the resilient sealing member as to permit the resilient sealing member to become bonded to the shaft while permitting the compression spring to force the rotary sealing member into engagement with the stationary sealing member regardless of the amount of wear of their engaging surfaces.

A further object of our invention is to permit a new seal to seat itself immediately regardless of the thickness or variation in resistance to yielding of any gasket such as is commonly used to seat the stationary sealing member of this type of seal. Other objects and advantages of our invention should be apparent of those skilled in the art after perusal of the accompanying drawing and the following description wherein like numerals refer to like parts throughout.

Figure 1:
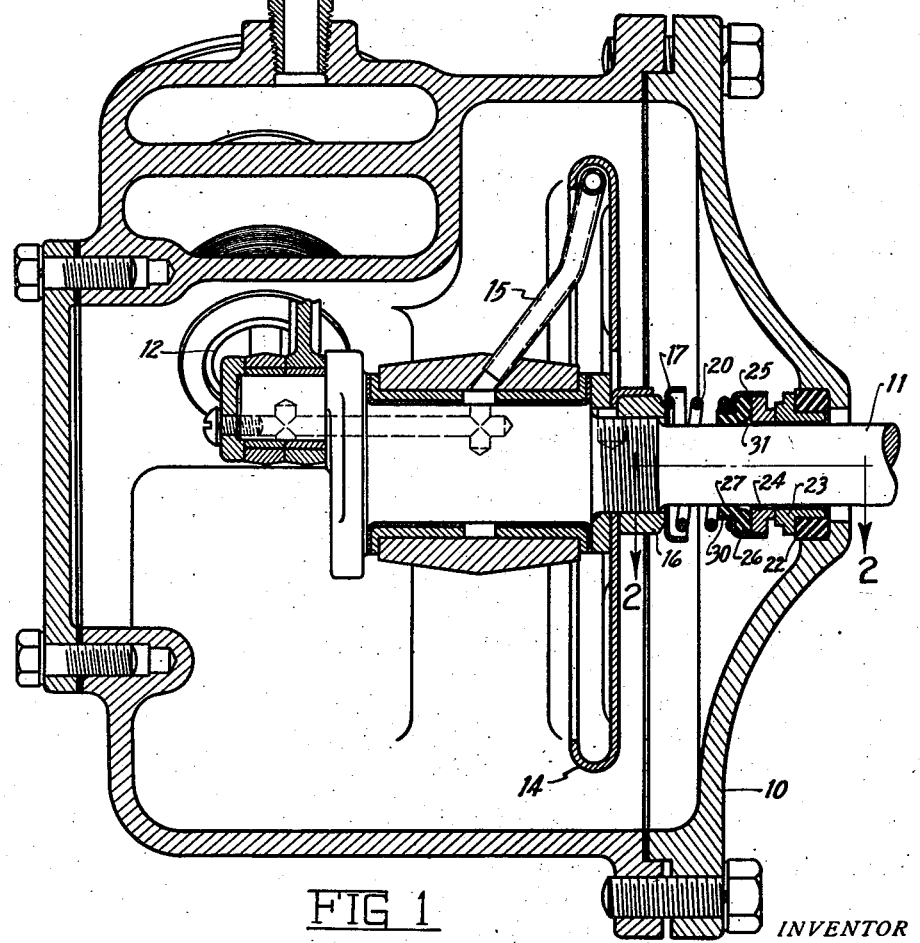

In the drawing, Fig. 1 is a vertical cross section through a form of compressor, the compressor being shown to illustrate the application of our invention to any machine; and Fig. 2 is an enlarged detail section taken along line 2—2 of Fig. 1.

Referring to Fig. 1, there is disclosed a compressor comprising a casing 10 in which is mounted a shaft 11 operating pistons 12 to compress refrigerant, in a manner more fully described and illustrated in the co-pending application of Charles P. Russell and Homer C. Simons, Serial No. 235,390, filed Oct. 17, 1938. As described and claimed in said application, an oiling member 14 dips into a body of lubricant retained in the lower portion of the casing 10 and forces oil into a tube 15 and thence into the bearings and pistons of the compressor. The oiling member 14 is retained in position by a locknut 16 which is screwed onto the shaft and forms a shoulder thereon upon which is seated a compression spring retaining cup 17. It is, of course, apparent that the locknut 16 and retaining cup 17 form one means of seating a compression spring 20 upon, and so as to rotate with, the shaft 11 and that other means may be provided as space and circumstances permit. The shaft 11 extends through an opening in the casing which is provided with an annular recess in which is seated a gasket 22, the gasket being formed of a resilient material immune to the attacks of refrigerant and oil, such as "Neoprene." The gasket 22 provides a seat for a stationary sealing member 23 which surrounds the shaft 11 at a slight space therefrom in order to permit the shaft 11 to rotate freely therein. The inner surface of the stationary sealing member 23 forms a sealing surface which is engaged by the outer surface of a rotary sealing member 24 which is likewise slightly spaced from the shaft 11. The rotary sealing member 24 is encircled by a band 25 which is provided with an inwardly extending flange against which the compression spring 20 thrusts. Between the flange of the band 25 and the rear surface of the rotary sealing member 24 there is positioned the outwardly extending annular flange 26 of a resilient sealing member 27, also made of material such as "Neoprene," which engages and grips the surface of the shaft 11. A band 30 is preferably provided to surround the reduced portion of the member 27 and to hold the same in firm engagement with the surface of the shaft. It can be seen that the spring 20 causes sealing engagement of the flange 26 with the rotary sealing member 24, and that when the seal is new and properly adjusted the spring 20 will cause the resilient sealing member 27, rotary sealing member 24 and stationary sealing member 23 to slide along shaft 11 and to compress the gasket 22 until the stationary sealing member 23 is firmly seated.

Upon rotation of the shaft the engaging surfaces of the sealing members 23 and 24 gradually wear away, and if the resilient sealing member 27 has become firmly bonded to the shaft 11 it is conceivable, and often happens, that the spring can no longer force the two hard sealing surfaces into engagement with the result that a charge of refrigerant becomes lost. In order to permit the resilient sealing member 27 to become firmly bonded to the shaft without destroying the usefulness of the seal, we have provided an annular recess 31 in the shaft engaging surface of the member 27 at the end thereof adjacent the rotary sealing member 24 and opposite the spring 20. The recess 31 is preferably of a depth substantially as great as the width of the flange 26, or stated in other words, the recess is of such character as to cause the flange 26 to be adjoined to the body of the member 27 by a narrow strip of material having strength to hold against the rupturing forces encountered but permitting flexure of the flange 26 to a far greater extent than would be the case if the recess were not present. With our improvement the member 27 may become firmly bonded to the shaft 11, and in the event that considerable wear of the engaging surfaces of members 23 and 24 occurs, the spring 20 acting upon the inwardly extending flange of band 25 causes the flange 26 to bend forward while still retaining sealing engagement with the rotary sealing member 24. The recess 31 permits the flange to bend forward without tearing away from the body of the resilient sealing member since there is sufficient room for the material adjacent the angle between the two parts of the member to deform and flow into unoccupied space.

Having described the preferred form of my invention it should be apparent to those skilled in the art that modifications in detail and arrangement thereof are permissible within the purview of the following claim.

We claim:

In a shaft seal for sealing the shaft opening through which a rotary shaft extends from a casing, said seal comprising an annular, stationary gasket seated in said casing at the inner edge of the shaft opening, a stationary, hard sealing member seated upon said gasket and loosely surrounding said shaft, a rotary, hard sealing member loosely surrounding said shaft, said hard sealing members having adjacent surfaces in running contact with each other for sealing the casing, a resilient sealing member comprising a portion surrounding and gripping said shaft in sealing engagement therewith and a flange extending radially therefrom and having a surface in sealing engagement with the surface of said rotary, hard sealing member opposite the sealing surface thereof, a shoulder on said shaft, and a compression spring compressed between said shoulder and said flange whereby to force the resilient sealing member, the rotary, hard sealing member, the stationary, hard sealing member, and the gasket into firm engagement with each other and to firmly press said gasket against said casing; the improvement comprising an improved resilient sealing member having an annular recess therein at the juncture of the surface engaging and gripping the shaft and the surface engaging said rotary, hard sealing member, said recess being of sufficient depth that the flange of said resilient sealing member is supported by a relatively narrow ring of resilient material permitting flexure of said flange with respect to said portion surrounding and gripping the shaft and said recess also providing a free space adjacent the surface of the shaft within which material of said flange may be forced to accommodate relative movement of the flange and the portion surrounding and gripping the shaft during stretching of said ring of resilient material in response to the thrust of said spring causing said rotary, hard sealing member to move away from said shoulder and toward said gasket as the engaging surfaces of said hard sealing members wear in use, whereby to permit the portion of said resilient sealing member surrounding and gripping said shaft to become bonded to the shaft without destroying the effectiveness of the shaft seal.

ROBERT W. CHRISTMAN.
WILLETT J. McCORTNEY.